(12) United States Patent
Warinner

(10) Patent No.: US 6,752,407 B2
(45) Date of Patent: Jun. 22, 2004

(54) SPRING-MOUNTING ARRANGEMENT

(75) Inventor: Derek Warinner, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 58 days.

(21) Appl. No.: 10/293,455

(22) Filed: Nov. 13, 2002

(65) Prior Publication Data

US 2004/0090035 A1 May 13, 2004

(51) Int. Cl.[7] ................................................. B60G 9/02
(52) U.S. Cl. ...................... 280/124.116; 280/124.128; 280/124.163; 267/64.19; 267/64.23
(58) Field of Search .................. 280/124.116, 124.128, 280/124.151, 124.163, 124.164; 267/64.19, 64.23, 64.27

(56) References Cited

U.S. PATENT DOCUMENTS

| | | | | |
|---|---|---|---|---|
| 5,037,126 A | * | 8/1991 | Gottschalk et al. | ... 280/124.116 |
| 5,342,139 A | * | 8/1994 | Hoffman | ..................... 403/327 |
| 5,382,006 A | * | 1/1995 | Arnold | ..................... 267/64.27 |
| 5,413,316 A | * | 5/1995 | Easter | ..................... 267/64.24 |
| 5,690,319 A | * | 11/1997 | Robinson et al. | ........ 267/64.19 |
| 5,921,532 A | * | 7/1999 | Pierce et al. | ............. 267/64.19 |
| 5,954,316 A | * | 9/1999 | Voss | ....................... 267/64.27 |
| 6,007,078 A | * | 12/1999 | Gottschalk et al. | .... 280/86.751 |
| 6,059,497 A | * | 5/2000 | Iannone | ....................... 410/87 |
| 6,691,989 B1 | * | 2/2004 | Leonard | ................... 267/64.28 |

* cited by examiner

*Primary Examiner*—Paul N Dickson
*Assistant Examiner*—Toan C To
(74) *Attorney, Agent, or Firm*—Jeffrey P. Calfa; Dennis Kelly Sullivan; Susan L. Lukasik

(57) ABSTRACT

An arrangement for mounting a flexible-bladder air spring to a mounting plate. A first end-plate of a flexible-bladder air spring has a retention projection fixedly attached to it and the retention projection defines a retention recess into itself in directions parallel to the first end-plate of the flexible-bladder air spring. A mounting plate is abutted against the first end-plate and the retention projection mounted to the first end-plate is disposed within a projection recess defined in the mounting plate. A retention pin extends through a pin recess defined through the mounting plate and the retention pin extends into the retention recess defined by the retention projection attached to the first end-plate of the flexible-bladder air spring.

24 Claims, 6 Drawing Sheets

SPRING-MOUNTING ARRANGEMENT

BACKGROUND OF THE INVENTION

The present invention relates constructions and methods of mounting flexible-bladder air springs to other components of a suspension system.

DRAWINGS

Other objects and advantages of the invention will become more apparent upon perusal of the detailed description thereof and upon inspection of the drawings in which:

FIG. 1 is a side elevational view of a vehicle according to the present invention that has a front suspension-unit that has a trailing link and a wheel axle clamped between a second-side clamping-structure and a mounting plate that is attached to a first end-plate of a flexible-bladder air spring according to the present invention. In FIG. 1 the wheels of the vehicle that would normally be disposed upon the side of the vehicle facing the viewer have been omitted for convenience of illustration of the present invention.

FIG. 2 is a close-up view of the front suspension-unit of the vehicle illustrated in FIG. 1.

FIG. 3 is a close-up view of a portion of a primary suspension-system of a vehicle in which a wheel axle and an axle-locating link that is a leaf spring are clamped between a second-side clamping-structure and a mounting plate that is attached to the first end-plate of a flexible-bladder air spring. The wheel of the vehicle that would normally be disposed on the end of the wheel axle facing the viewer has been omitted from FIG. 3 for convenience of illustration of the present invention.

Figure 6:
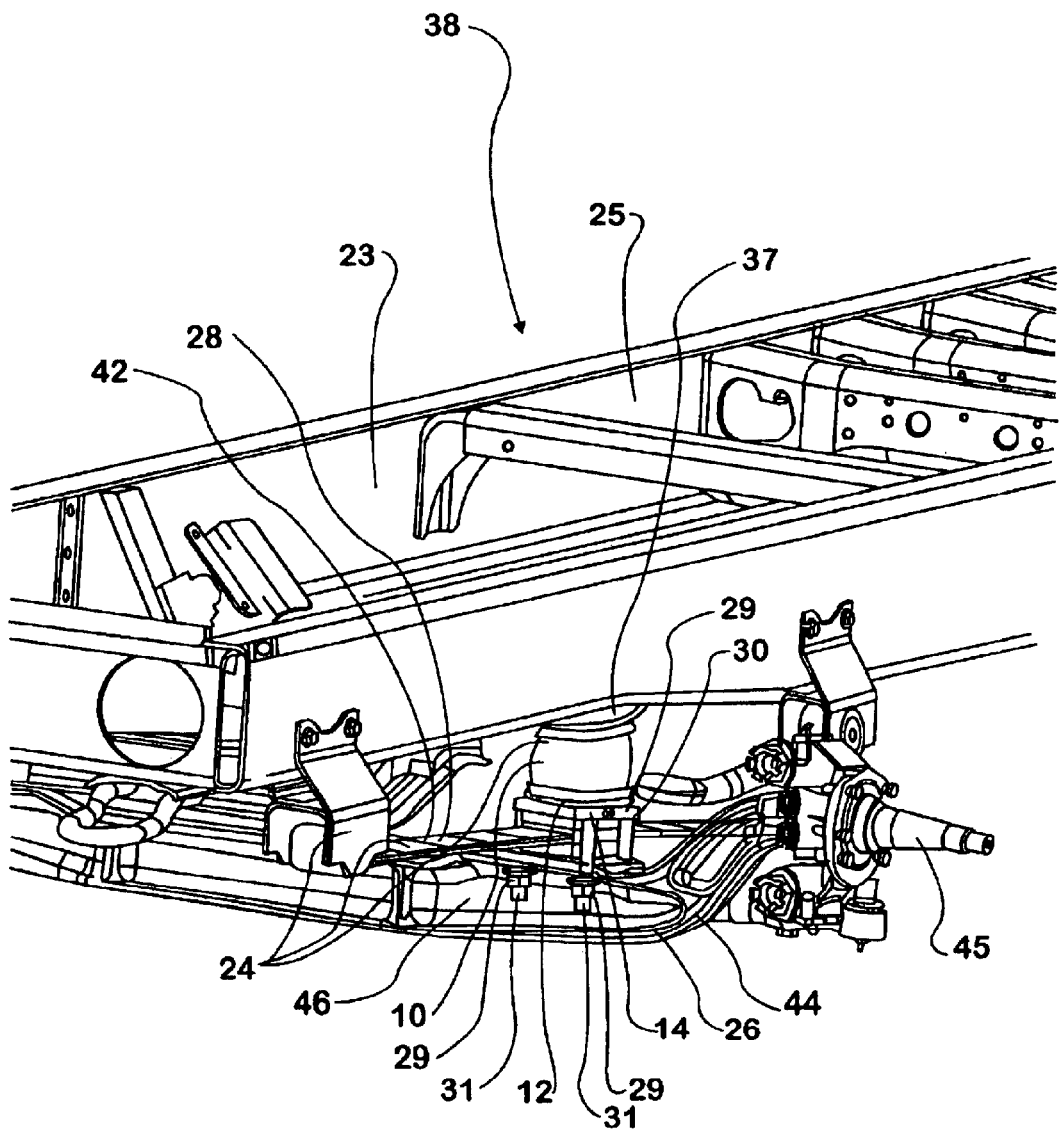

FIG. 6 is a perspective view of an assembly according to the present invention that includes a frame structure that is supported by a primary suspension system that includes a mounting plate that is attached to a first end-plate of a flexible-bladder air spring and that is supported by a steer axle. The wheel that would normally be mounted to the spindle of the steer axle has been omitted for convenience of illustration of the present invention.

DETAILS OF INVENTION

Various assemblies according to the present invention and subsets thereof are illustrated in FIGS. 1–6. An assembly 38 according to the present invention comprises a flexible-bladder air spring 10 that includes a flexible bladder 11 with a first end-plate 12 attached to one end of the flexible bladder 11 and a second end-plate 37 attached to an opposite end of the of the flexible bladder 11. The flexible bladder 11 and the first end-plate 12 and the second end-plate 37 in combination define an air-tight, chamber that changes in size and thus effects compression or expansion of any gas contained therein, when the first end-plate 12 and the second end-plate 37 move toward or away from one another. Of course it will be understood that, while the chamber of the flexible-bladder air spring is generally air tight there may be ports in its first end-plate 12 or its second end-plate 37 through which it is in fluid communication with other air-tight chambers or valves that may be selectively opened to allow the influx of fluid into or the exhaust of fluid from the chamber of the flexible-bladder air spring 10. Such flexible-bladder air springs 10 are well-known and are commonly used in suspension systems of heavy-duty truck vehicles.

At least one of the flexible-bladder air springs 10 of an assembly according to the present invention has a retention projection 13 attached to and protruding from its first end-plate 12. The retention projection 13 defines a retention recess 39 that extends into the retention projection 13 in directions parallel to the first end-plate 12. An assembly 38 according to the present invention comprises one or more mounting plates 14 that abut the first end-plate 12 of one or more of the flexible-bladder air springs 10 that have retention projections 13 as described above. Such mounting plates 14 have a projection recess 15 disposed adjacent the first end-plate 12 and the retention projection 13 extends into the projection recess 15. Such mounting plates 14 also define a pin recess 16 that extends from an outer surface of the mounting plate 14 through the mounting plate 14 in directions parallel to the first end-plate 12 that the mounting plate 14 abuts and intersects the projection recess 15 in the mounting plate 14. A retention pin 40 extends from outside the mounting plate 14, through the pin recess 16 in the mounting plate 14 and into the retention recess 39 defined by the retention projection 13. Abutment between the retention projection 13 and the portions of the mounting plate 14 that define the projection recess 15 in directions parallel to the first end-plate 12 prevents relative movement between the first end-plate 12 and the mounting plate 14 in direction parallel to the first end-plate 12. Abutment between the retention pin 40 and the portion of the retention projection 13 that forms the side of the retention recess 39 opposite the first end-plate 12 prevents separation of the first end-plate 12 from the mounting plate 14. Thus, the mounting plate 14 is locked to the first end-plate 12.

The retention projection 13 that is attached to the first end-plate 12 of a flexible-bladder air spring 10 of an assembly 38 according to the present invention and the retention recess 39 that the retention projection 13 defines may be of any of an innumerable different shapes that would allow them to cooperate with the projection recess 15 in the mounting plate 14 and the retention pin 40 to lock the mounting plate 14 to the first end-plate 12. In some embodiments of the present invention, such as the one shown in FIG. 4, the retention projection 13 is a retention collar that has circular cross-sections parallel to the first end-plate 12 along substantially its entire extent. In some such embodiments of the present invention, such as the one shown in FIG. 4, the retention recess 39 defined by the retention projection 13 is an annular retention-groove that extends around the retention collar parallel to the first end-plate 12. Such constructions of a retention projection 13 as a retention collar with a retention recess 39 that is an annular groove parallel to the first end-plate 12, advantageously allow for attachment of the flexible-bladder air spring 10 to the mounting plate 14 in any angular orientation about axes perpendicular to the first end-plate 12.

A retention projection 13 may be attached to the first end-plate 12 of a flexible-bladder air spring 10 through virtually any means that has suitable strength to endure the forces that will be transferred between the mounting plate 14 and the flexible-bladder air spring 10. In some embodiments of the present invention, such as the one shown in FIGS. 4, the first end-plate 12 of a flexible-bladder air spring 10 and/or structure attached thereto defines one or more threaded bores 21 for reception of one or more projection-retention bolts 19. In these embodiments of the present invention the retention projection 13 defines one or more attachment bores that extend through it and that are aligned with the threaded bores 21 defined by the first end-plate 12 and/or structure attached thereto. In these embodiments of the present invention a projection-retention bolt 19 extends from its bolt head 20, which is disposed upon a side of the retention projection 13 opposite the first end-plate 12, through one of the attachment bores and into threaded engagement one of the threaded bores 21 defined by the first end-plate 12 and/or structure fixedly attached thereto. Construction of an assembly 38 according to the present invention with such a means of attaching the retention projection 13 to the first end-plate 12 can advantageously be done with conventionally constructed flexible-bladder air springs 10, which commonly have one or more threaded bores 21 defined by the first end-plate 12 and/or structure fixedly attached thereto.

In many embodiments of the present invention mounting plate 14 that is attached to a first end-plate 12 of a flexible-bladder air spring 10 as described above will be attached to other components of the assembly 38. The manner of such attachment of a mounting plate 14 to other components of an assembly 38 according to the present invention may be virtually any that is suitable for the application in which the assembly 38 will be used. In some embodiments of the present invention an assembly 38 according thereto comprises mounting bolts 32 extend through holes in the mounting plate 14 and attach the mounting plate 14 to other components of the assembly 38. In some such embodiments of the present invention the mounting plate 14 defines one or more countersinks 35 on the side of mounting plate 14 that is in abutment with the first end- plate 12 of the flexible-bladder air spring 10 and within one or more of which is disposed a bolt head 33 of one of said mounting bolts 32. In many such embodiments of the present invention one or more of the countersinks 35 within which a bolt head 33 of a mounting bolt 32 is disposed is covered by the first end-plate 12 of the flexible-bladder air spring 10 and, thus, the bolt head 33 is surrounded by the structure that defines the countersinks 35 and the first end-plate 12 of the flexible-bladder air spring 10. Construction of an assembly 38 according to the present invention with the bolt heads 33 of one or more of the mounting bolts 32 within the perimeter of the first end-plate 12 of the flexible-bladder air spring 10 is relatively space efficient.

Some assemblies 38 according to the present invention, such as those shown in FIGS. 1, 2, 3, and 6, comprise a component that is attached to the assembly in abutment against a side of the mounting plate 14 opposite the first end plate 12 of the flexible-bladder air spring 10. In such embodiments of the present invention the manner in which the retention projection 13, the projection recess 15, and the retention pin 40 cooperate to attach the mounting plate 14 to the first end-plate 12 is advantageous because it enables considerable flexibility in the order of construction of the assembly 38. The first end plate 12 can be attached to the mounting plate 14 and the opposite-side component 41 can be subsequently attached thereto in abutment with the side of the mounting plate 14 opposite the first end plate 12. Alternatively, the opposite-side component 41 can be attached to the mounting plate 14 in abutment with the side of the mounting plate 14 opposite that which the first end-plate 12 is to be abutted against and the first end-plate 12 can then be attached to the mounting plate 14 by inserting the retention projection 13 into the projection recess 15 and then the retention pin 40 may then be inserted into the pin recess 16 and then into the retention recess 39 of the retention projection 13.

The construction of the retention pin 40 and the provisions for securing it in proper engagement within the pin recess 16 of the mounting plate 14 and the retention recess 39 of the retention projection 13 may be of any design according to the present invention that is suitable for the intended application of a given embodiment of an assembly 38 according to the present invention. In some embodiments of the present invention, such as the one shown in FIGS. 4, the pin recess 16 defined by the mounting plate 14 is threaded and the retention pin 40 is a retention bolt that is threadedly engaged within the pin recess 16. Such an engagement of the retention pin 40 to the mounting plate 14 is a relatively secure manner of engagement that is resistant to undesirable, inadvertent disengagement of the retention pin 40 from the retention recess 39 of the retention projection 13.

Having reviewed this disclosure and the associated drawings, a person of ordinary skill in the art could easily construct innumerable different types of assemblies 38 in accordance with the teachings of this disclosure that are, thus, in accordance with the present invention. In some embodiments of the present invention, such as those shown in FIGS. 1, 2, 3, and 6, an assembly 38 according to the present invention is a vehicle 22. A vehicle 22 according to the present invention comprises one or more rigid frame structures 23 to which a majority of other components of the vehicle 22 are engaged directly or indirectly and from which those other components of the vehicle 22 derive support directly or indirectly. A vehicle 22 according to the present invention also comprises a primary suspension-system 24 that is engaged to and supports the one or more frame structures 23 of the vehicle 22 above the ground. The primary suspension-system 24 of the vehicle 22 also provides the vehicle 22 with a relatively low resistance to movement along the ground. In a vehicle 22 according to the present invention the flexible-bladder air spring 10 and the mounting plate 14 are part of suspension system of the vehicle 22. In a vehicle 22 according to the present invention the flexible-bladder air spring 10 that is attached to a mounting plate 14 in a manner according to the present invention is part of a suspension system that supports a mounted component 25 of the vehicle 22 from a mounting component 26 of the vehicle 22. In such embodiments of the present invention the mounting plate 14 is attached directly or indirectly to one of the mounted component 25 and the mounting component 26 and the second end-plate 37 is attached to the other of the mounted component 25 and the mounting component 26 in such a manner that flexible-bladder air spring 10 supports some of the weight of the mounted component 25. The primary suspension-system 24 of a vehicle 22 according to the present invention may be constructed with a flexible-bladder air spring 10 and a mounting plate 14 engaged to one another in accordance with the present invention. Additionally or alternatively a vehicle 22 according to the present invention may comprise any number of other types and applications of suspension systems that include a flexible-bladder air spring 10 and a mounting plate 14 attached to one another in accordance with the present invention.

In embodiments of the present invention in which the assembly 38 thereof is a vehicle 22 that comprises a primary suspension-system 24 with a flexible-bladder air spring 10 that has its first end-plate 12 attached to a mounting plate 14 in accordance with the present invention, the mounted component 25 supported by the primary suspension-system 24 is one of the frame structures 23 of the vehicle 22 and the mounting component 26 from which the primary suspension-system 24 supports the frame structure 23 is a wheel axle 27 of the vehicle 22. Thus, in such embodiments of the present invention a flexible-bladder air spring 10 has its first end-plate 12 engaged to a mounting plate 14 in accordance with the present invention and that mounting plate 14 is, in turn, engaged directly or indirectly to either the frame structure 23 or the wheel axle 27 of the vehicle 22. The second end-plate 37 of the flexible-bladder air spring 10 is engaged directly or indirectly to whichever of the frame structure 23 and the wheel axle 27 the mounting plate 14 attached to the first end-plate 12 is not engaged to.

Figure 1:
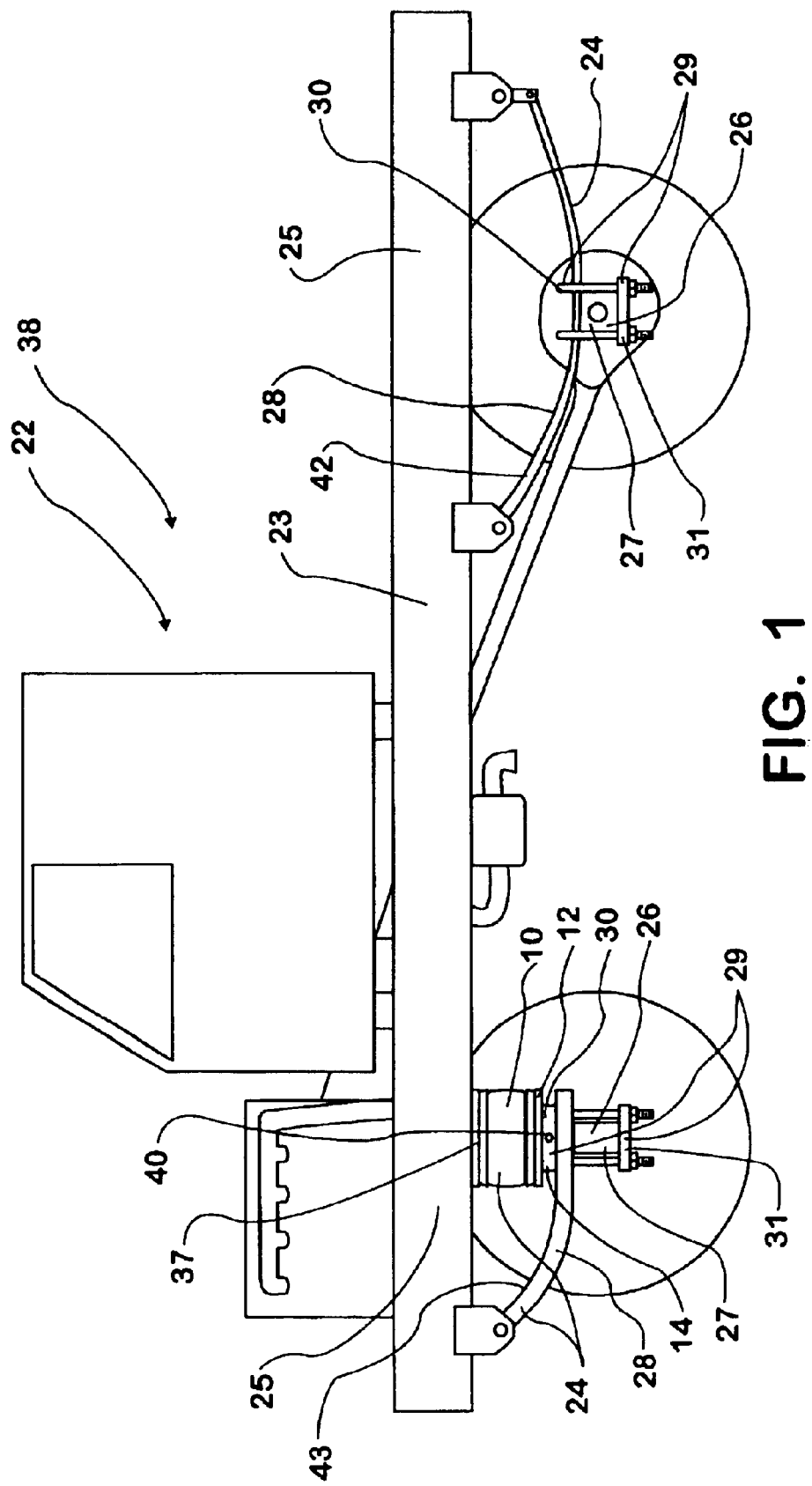
Figure 2:
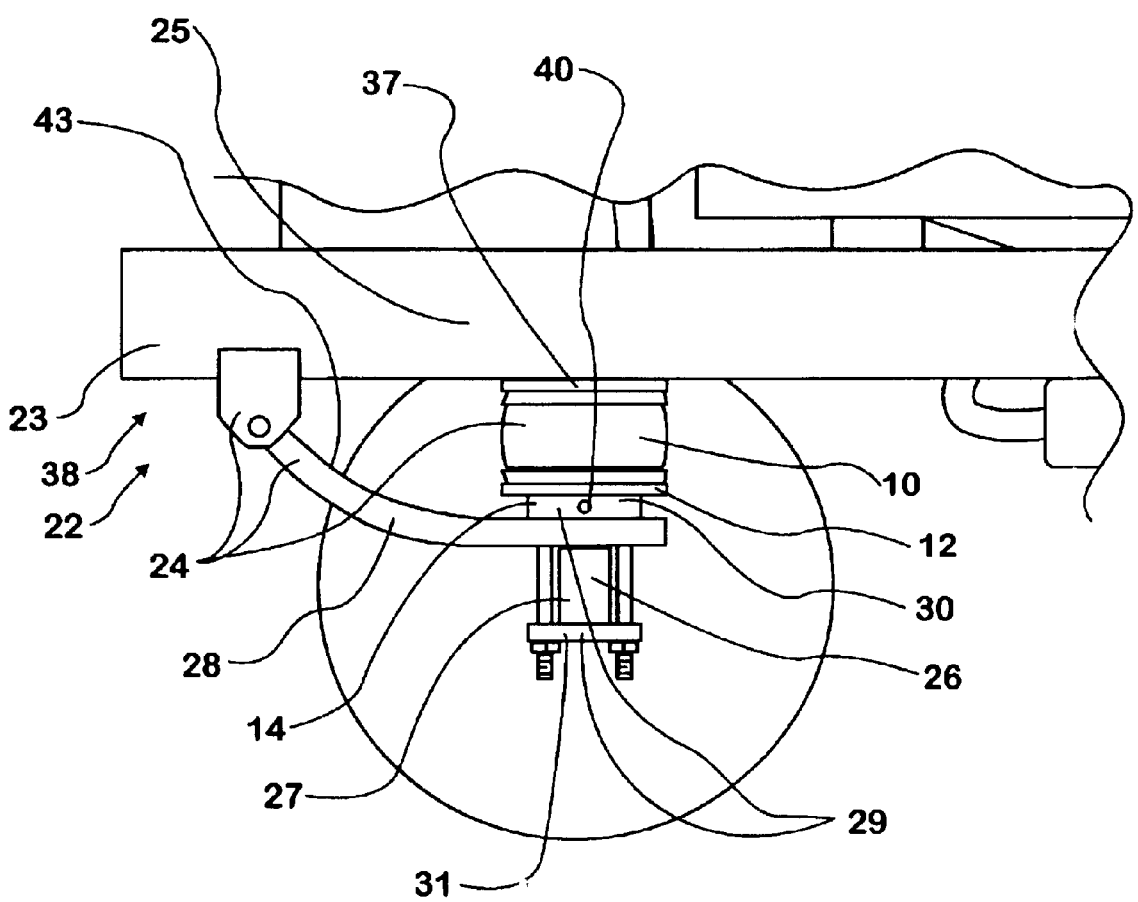
Figure 3:
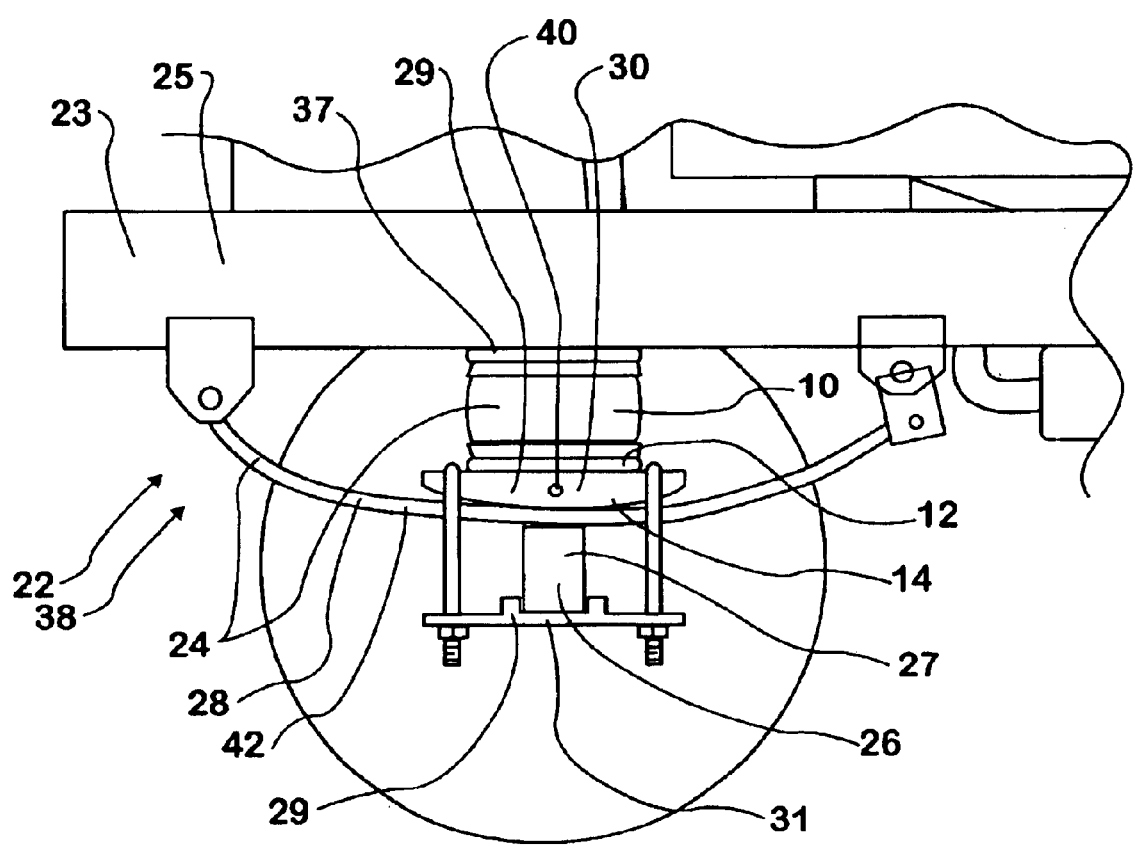
Figure 4:
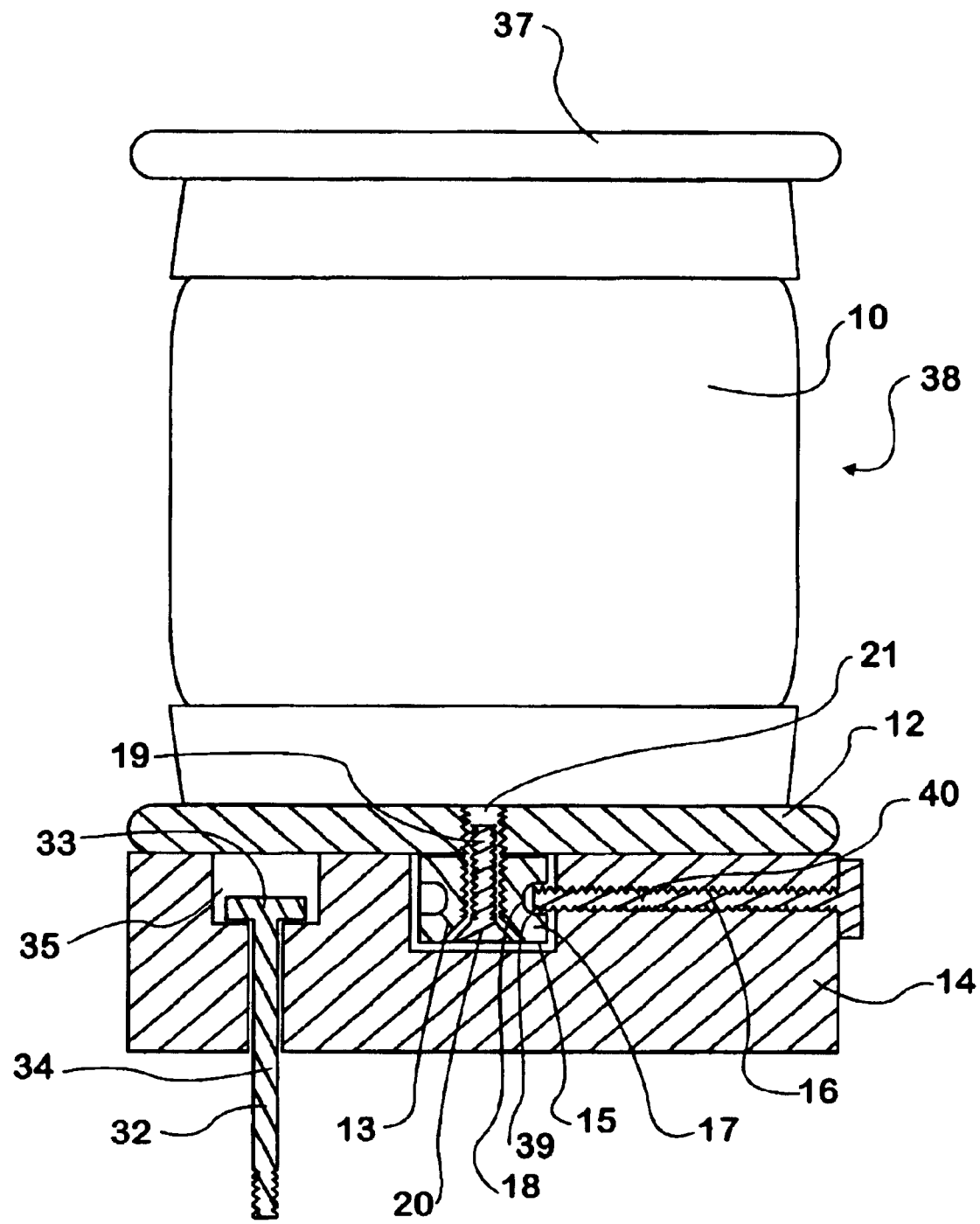
FIG. 4 is an illustration, partially in section, of an assembly according to the present invention that comprises a retention projection that is a retention collar that defines a retention recess that is an annular retention groove that extends parallel to the first end-plate of the flexible-bladder air spring.
Figure 5:
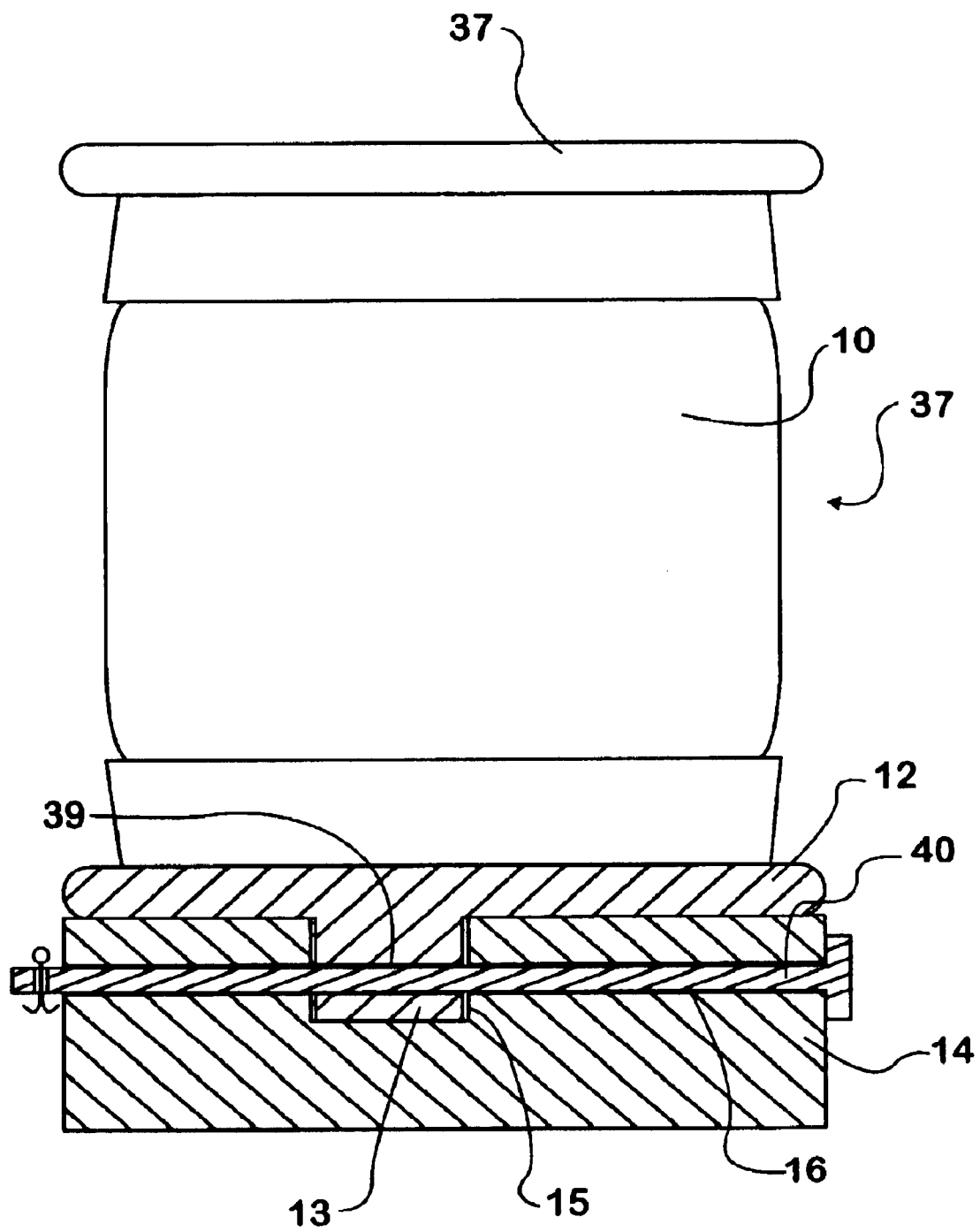
FIG. 5 is an illustration, partially in section, of an assembly according to the present invention that comprises a retention projection that is integrally engaged to the first end-plate of the flexible-bladder air spring and which retention projection defines a retention recess that extends all the way through it in a direction parallel to the first end-plate of the flexible-bladder air spring.

In many embodiments of the present invention, such as those shown in FIGS. 1, 2, 3, and 6, the primary suspension-system 24 of a vehicle 22 includes an axle-locating link 28 that functions in combination with other components of the primary suspension-system 24 to locate a frame structure 23 of the vehicle 22 relative to a wheel axle 27 of the vehicle 22. In many embodiments, such an axle-locating link 28 is fixedly engaged to the wheel axle 27 and is pivotally engaged, often about an axis perpendicular to the wheel axle 27, to the frame structure 23 at a point distant from its engagement to the wheel axle 27. There are many different manners of construction and engagement of such a wheel axle 27, axle-locating link 28, and frame structure 23 that are well-known to and/or easily imaginable by a person of ordinary skill in the art and that could be utilized on vehicles 22 according to the present invention for different applications. One construction and engagement to one another of an axle-locating link 28, a wheel axle 27, and a frame structure 23 of a vehicle 22 is shown in FIG. 3 in which the axle-locating link 28 is a leaf-spring 42 that is engaged to the wheel axle 27 and the frame structure 23 of the vehicle in a conventional manner and also through the novel engagement of a flexible-bladder air spring 10 to the wheel axle 27, leaf spring 42, and frame structure 23 in accordance with the present invention. Another construction and engagement to one another of an axle-locating link 28, a wheel axle 27, and a frame structure 23 of a vehicle 22 is shown in FIG. 2 in which the axle-locating link 28 is a trailing link 43 that is constructed and engaged to the wheel axle 27 and the frame structure 23 in a conventional manner except that its engagement to the frame structure 23 through the flexible-bladder air spring 10 is in accordance with the present invention. It will of course be understood that in addition to constructions similar to those shown in FIGS. 2 and 3, a vehicle 10 according to the present invention may include innumerable other constructions and engagements to one another of an axle-locating link 28, a wheel axle 27, and a frame structure 23 of the vehicle 22.

An axle-locating link 28 and a wheel axle 27 of a vehicle 22 according to the present invention may be fixedly engaged to one another in any manner suitable for the application for which that vehicle 22 is intended. In some embodiments of the present invention, such as those shown in FIGS. 1, 2, 3, and 6, the axle-locating link 28 and the wheel axle 27 are clamped to one another by a clamping assembly 29 that includes a first-side clamping-structure 30 and a second-side clamping-structure 31 between which the axle-locating link 28 and the wheel axle 27 are clamped. It will of course be understood that, in addition to the wheel axle 27 and axle-locating link 28, there may be other components such as spacers and brackets that are clamped between the first-side clamping-structure 30 and the second-side clamping-structure 31 of a clamping assembly 29 that clamps an axle-locating link 28 and a wheel axle 27 together. In some embodiments of the present invention, such as those shown in FIGS. 1, 2, 3, and 6, one of the first-side clamping-structure 30 and the second-side clamping-structure 31 of such a clamping assembly 29 is a mounting plate 14 that is attached to a first end-plate 12 of a flexible-bladder air spring 10 through a retention pin 40 engaged to a retention projection 13 in a manner according to the present invention. Such a construction of a vehicle 22 is cost efficient because the mounting plate 14 functions both to attach the first end-plate 12 of the flexible-bladder air spring 10 to the other components of the primary suspension-system 24 and also to clamp the axle-locating link 28 and the wheel axle 27 to one another. In embodiments according to the present invention in which a mounting plate 14 is attached to the first end-plate 12 of a flexible-bladder air spring 10 in accordance with the present invention and the mounting plate 14 further constitutes either first-side clamping-structure 30 or second-side clamping-structure 31 whichever of the first-side clamping-structure 30 and the second-side clamping-structure 31 is not constituted by the mounting plate 14 may be any of a number of different types of structures including, but not limited to plates, the bridge of a u-bolt that extends between the legs, bolt heads, and/or threaded nuts. Embodiments in which the mounting plate 14 is a first-side clamping-structure 30 or a second-side clamping-structure 31 of a clamping assembly 29 between which a wheel axle 27 and an axle-locating link 28 are clamped are one category of embodiments of the present invention that have a component abutted against the mounting plate 14 on a side thereof opposite the first end-plate 12 of the flexible-bladder air spring 10 as was described above.

A wheel axle 27 of a primary suspension-system 24 according to the present invention may be of any of innumerable different designs that has wheels rotatably attached to it. In some embodiments of the present invention a flexible-bladder air-spring 10 that is attached to a mounting plate 14 in a manner according to the present invention is supported directly or indirectly by a wheel axle 27 that is a steer axle 44 of the vehicle 22. A steer axle 44 of a vehicle 22 includes an axle beam 46 with spindles 45 pivotally engaged to its ends. The spindles 45 of a steer axle 44 have wheels mounted to them in such a manner that the wheels are rotatable about the axis of the spindle 45, which is disposed approximately horizontal. Each spindles 45 of a steer axle 44 are engaged to the axle beam 46 in such a manner that they can pivot relative to the axle beam 46 about an axis that is substantially vertical. This pivotal engagement of the spindles 45 to the axle beam 46 of a steer axle 44 allows the direction in which the wheels that are attached to those spindles 45 to be changed to change the direction in which the vehicle 22 travels along the ground. In some embodiments of the present invention a steer axle 45 and an axle-locating link 28 of the primary suspension-system 24 of a vehicle 22 are clamped between a first-side clamping-structure 30 and a second-side clamping-structure one of which is a mounting plate 14 to which the first end-plate 12 of a flexible-bladder air spring 10 is connected through engagement of a retention pin 40 to a retention projection 13 attached to the first end-plate 12 in a manner according to the present invention. Such a construction of a vehicle 22 is cost efficient because the mounting plate 14 functions both to attach the first end-plate 12 of the flexible-bladder air spring 10 to the other components of the primary suspension-system 24 and also to clamp the axle-locating link 28 and the steer axle 44 to one another. Such a construction of a vehicle 22 according to the present invention further provides the collateral advantage of locating the flexible-bladder air spring 10 in alignment with the axle beam 46 of the steer axle 44. Location of the flexible-bladder air spring 10 in alignment with the axle beam 46 of the steer axle 44 is beneficial because a flexible-bladder air spring 10 that is so positioned presents no obstruction to pivoting of an adjacent spindle 45 and a wheel mounted thereto relative to the axle beam 46 of the steer axle 44. This is advantageous because, in most embodiments of vehicles 22 according to the present invention, it is desirable for the wheels attached to the spindles 45 of any steer axle 44 thereof to have as wide a range of pivotal movement relative to the axle beam 46 as possible in order to provide the vehicle 22 with as small a turning radius as possible.

It will, of course, be understood that a vehicle 10 according to the present invention could be of any of a number of different constructions within the guidelines set forth above and that some features of the invention could be employed without a corresponding use of other features.

I claim:

1. An assembly, comprising:
   (a) a flexible-bladder air spring with an air-tight chamber defined and surrounded by a flexible bladder and a first end-plate and a second end-plate that are attached to opposite ends of said flexible bladder;
   (b) a mounting plate that is abutted against said first end-plate and which defines a projection recess at a side of said mounting plate that is adjacent said first end-plate;
   (c) a retention projection that is fixedly attached to and protrudes from said first end-plate into said projection recess;
   (d) wherein said mounting plate defines a projection recess that extends into said mounting plate in directions perpendicular to said first end-plate and said retention projection is disposed within said projection recess;
   (e) wherein said retention projection defines a retention recess that extends into said retention projection in directions parallel to said first end-plate;
   (f) wherein said mounting plate defines a pin recess that extends from an outer surface thereof in directions parallel to said first end-plate;
   (g) wherein said pin recess intersects said projection recess; and
   (h) wherein a retention pin extends from outside said mounting plate, through said pin recess and into said projection recess and said retention recess defined by said mounting projection and thereby locks said mounting plate to said flexible-bladder air spring.

2. The assembly of claim 1, wherein:
   (a) said retention projection is a retention collar and said retention recess defined by said retention projection is an annular groove that is parallel to said first end-plate.

3. The assembly of claim 2, wherein:
   (a) said retention collar defines an axial bore that extends through it in directions perpendicular to said first end-plate; and
   (b) a projection-retention bolt extends from its bolt head which is disposed upon a side of said retention collar opposite said first end-plate, through said axial bore of said retention collar and into threaded engagement with a threaded bore defined by said first end-plate or structure fixedly attached thereto.

4. The assembly of claim 3, wherein:
   (a) said assembly comprises a component that is abutted against a side of said mounting component opposite said first end plate.

5. The assembly of claim 4, wherein:
   (b) said assembly comprises one or more mounting bolts that have their bolt heads disposed within countersinks defined by said mounting plate on its side that abuts said first end-plate;
   (c) a shaft of each of said mounting bolt protrudes through a bore in said mounting plate away from said first end-plate; and
   (d) one or more of said countersinks defined by said mounting plate is covered by said end plate and, thus, each of said bolt heads of said mounting bolts is surrounded by said countersinks defined by said mounting plate and said first end-plate.

6. The assembly of claim 5, wherein:
   (a) said retention pin is a plate-retention bolt that is threadedly engaged to a portion of said mounting plate that defines said pin recess.

7. The assembly of claim 6, wherein:
   (a) said assembly is a vehicle;
   (b) said vehicle further comprises one or more rigid frame structures to which a majority of other components of said vehicle are engaged directly or indirectly and from which said components derive support directly or indirectly;
   (c) said vehicle further comprises a primary suspension-system that is engaged to and supports said one or more frame structures above the ground and that provides said vehicle with a relatively low resistance to movement along the ground;
   (d) said flexible-bladder air spring is part of a suspension system of said vehicle that supports a mounted component of said vehicle from a mounting component of said vehicle;
   (e) said first end-plate of said flexible-bladder air spring is attached through said mounting plate to said mounted component or said mounting component; and
   (f) said second end-plate of said flexible-bladder air spring is attached directly or indirectly to whichever of said mounted component and said mounting component said first end-plate is not attached to.

8. The assembly of claim 7, wherein:
   (a) said suspension system that said flexible-bladder air spring is part of is said primary suspension-system of said vehicle; and
   (b) said mounted component is one of said frame structures of said vehicle and said mounting component is a wheel axle of said vehicle.

9. The assembly of claim 8, wherein:
   (a) said primary suspension system comprises an axle-locating link that is clamped to said wheel axle by a clamping assembly that comprises a first-side clamping structure and a second-side clamping structure between which said wheel axle and said axle-locating link are clamped together;
   (b) said axle-locating link is pivotally engaged to said frame structure at a point distant from said clamping assembly;
   (c) said first-side clamping structure comprises said mounting plate; and
   (d) said wheel axle and said axle-locating link are clamped between said second-side clamping structure and said mounting plate on a side of said mounting plate opposite said first end-plate of said flexible-bladder air spring.

10. The assembly of claim 9, wherein:
(a) said wheel axle is a steer axle of said vehicle.

11. The assembly of claim 3, wherein:
(a) said assembly is a vehicle;
(b) said vehicle further comprises one or more rigid frame structures to which a majority of other components of said vehicle are engaged directly or indirectly and from which said components derive support directly or indirectly;
(c) said vehicle further comprises a primary suspension-system that is engaged to and supports said one or more frame structures above the ground and that provides said vehicle with a relatively low resistance to movement along the ground;
(d) said flexible-bladder air spring is part of a suspension system of said vehicle that supports a mounted component of said vehicle from a mounting component of said vehicle;
(e) said first end-plate of said flexible-bladder air spring is attached through said mounting plate to said mounted component or said mounting component; and
(f) said second end-plate of said flexible-bladder air spring is attached directly or indirectly to whichever of said mounted component and said mounting component said first end-plate is not attached to.

12. The assembly of claim 11, wherein:
(a) said suspension system that said flexible-bladder air spring is part of is said primary suspension-system of said vehicle; and
(b) said mounted component is one of said frame structures of said vehicle and said mounting component is a wheel axle of said vehicle.

13. The assembly of claim 12, wherein:
(a) said primary suspension system comprises an axle-locating link that is clamped to said wheel axle by a clamping assembly that comprises a first-side clamping structure and a second-side clamping structure between which said wheel axle and said axle-locating link are clamped together;
(b) said axle-locating link is pivotally engaged to said frame structure at a point distant from said clamping assembly;
(c) said first-side clamping structure comprises said mounting plate; and
(d) said wheel axle and said axle-locating link are clamped between said second-side clamping structure and said mounting plate on a side of said mounting plate opposite said first end-plate of said flexible-bladder air spring.

14. The assembly of claim 13, wherein:
(a) said wheel axle is a steer axle of said vehicle.

15. The assembly of claim 1, wherein:
(a) said assembly is a vehicle;
(b) said vehicle further comprises one or more rigid frame structures to which a majority of other components of said vehicle are engaged directly or indirectly and from which said components derive support directly or indirectly;
(c) said vehicle further comprises a primary suspension-system that is engaged to and supports said one or more frame structures above the ground and that provides said vehicle with a relatively low resistance to movement along the ground;
(d) said flexible-bladder air spring is part of a suspension system of said vehicle that supports a mounted component of said vehicle from a mounting component of said vehicle;
(e) said first end-plate of said flexible-bladder air spring is attached through said mounting plate to said mounted component or said mounting component; and
(f) said second end-plate of said flexible-bladder air spring is attached directly or indirectly to whichever of said mounted component and said mounting component said first end-plate is not attached to.

16. The assembly of claim 15, wherein:
(a) said suspension system that said flexible-bladder air spring is part of is said primary suspension-system of said vehicle; and
(b) said mounted component is one of said frame structures of said vehicle and said mounting component is a wheel axle of said vehicle.

17. The assembly of claim 16, wherein
(a) said primary suspension system comprises an axle-locating link that is clamped to said wheel axle by a clamping assembly that comprises a first-side clamping structure and a second-side clamping structure between which said wheel axle and said axle-locating link are clamped together;
(b) said axle-locating link is pivotally engaged to said frame structure at a point distant from said clamping assembly;
(c) said first-side clamping structure comprises said mounting plate; and
(d) said wheel axle and said axle-locating link are clamped between said second-side clamping structure and said mounting plate on a side of said mounting plate opposite said first end-plate of said flexible-bladder air spring.

18. The assembly of claim 17, wherein:
(a) said wheel axle is a steer axle of said vehicle.

19. The assembly of claim 18, wherein:
(a) said assembly comprises a component that is abutted against a side of said mounting component opposite said first end plate.

20. The assembly of claim 18, wherein:
(a) said assembly comprises one or more mounting bolts that have their bolt heads disposed within countersinks defined by said mounting plate on its side that abuts said first end-plate;
(b) a shaft of each of said mounting bolt protrudes through a bore in said mounting plate away from said first end-plate; and
(c) one or more of said countersinks defined by said mounting plate is covered by said end plate and, thus, each of said bolt heads of said mounting bolts is surrounded by said countersinks defined by said mounting plate and said first end-plate.

21. The assembly of claim 17, wherein:
(a) said assembly comprises a component that is abutted against a side of said mounting component opposite said first end plate.

22. The assembly of claim 17, wherein:
(a) said assembly comprises one or more mounting bolts that have their bolt heads disposed within countersinks defined by said mounting plate on its side that abuts said first end-plate;
(b) a shaft of each of said mounting bolt protrudes through a bore in said mounting plate away from said first end-plate; and
(c) one or more of said countersinks defined by said mounting plate is covered by said end plate and, thus, each of said bolt heads of said mounting bolts is surrounded by said countersinks defined by said mounting plate and said first end-plate.

23. The assembly of claim 1, wherein:
(a) said assembly comprises a component that is abutted against a side of said mounting component opposite said first end plate.

24. The assembly of claim 1, wherein:
(a) said assembly comprises one or more mounting bolts that have their bolt heads disposed within countersinks defined by said mounting plate on its side that abuts said first end-plate;

(b) a shaft of each of said mounting bolt protrudes through a bore in said mounting plate away from said first end-plate; and (c) one or more of said countersinks defined by said mounting plate is covered by said end plate and, thus, each of said bolt heads of said mounting bolts is surrounded by said countersinks defined by said mounting plate and said first end-plate.

* * * * *